March 10, 1925. 1,529,164
T. CARDWELL
MACHINE FOR MECHANICALLY SEALING ENVELOPES AND THE LIKE
Filed March 29, 1924 10 Sheets-Sheet 1

INVENTOR
Thomas Cardwell,
by Bright & Bailey
Attys.

March 10, 1925.

T. CARDWELL 1,529,164

MACHINE FOR MECHANICALLY SEALING ENVELOPES AND THE LIKE

Filed March 29, 1924    10 Sheets-Sheet 5

INVENTOR
Thomas Cardwell,
by Bright & Bailey
ATT'YS

March 10. 1925. 1,529,164
T. CARDWELL
MACHINE FOR MECHANICALLY SEALING ENVELOPES AND THE LIKE
Filed March 29, 1924   10 Sheets-Sheet 7

INVENTOR
Thomas Cardwell,
by Bright & Bailey
Attys

March 10, 1925. 1,529,164
T. CARDWELL
MACHINE FOR MECHANICALLY SEALING ENVELOPES AND THE LIKE
Filed March 29, 1924 10 Sheets-Sheet 8

INVENTOR
Thomas Cardwell,
by Bright & Bailey
Attys.

March 10, 1925. 1,529,164
T. CARDWELL
MACHINE FOR MECHANICALLY SEALING ENVELOPES AND THE LIKE
Filed March 29, 1924 10 Sheets-Sheet 10

INVENTOR
Thomas Cardwell,
by Bright & Bailey
Attys.

Patented Mar. 10, 1925.

1,529,164

UNITED STATES PATENT OFFICE.

THOMAS CARDWELL, OF PRESTON, ENGLAND.

MACHINE FOR MECHANICALLY SEALING ENVELOPES AND THE LIKE.

Application filed March 29, 1924. Serial No. 702,786.

*To all whom it may concern:*

Be it known that I, THOMAS CARDWELL, subject of the King of Great Britain, residing at 23 Avenham Lane, Preston, Lancashire, England, have invented a new or Improved Machine for Mechanically Sealing Envelopes and the like; and I do hereby declare the following to be a full, clear, and exact description in the invention, such as will enable others skilled in the art to which it appertains to make and use the same.

This invention relates to machines for moistening the flaps of envelopes and sealing them and if desired but not essentially for simultaneously affixing postage stamps thereto and in particular to such machines of the type constituted by my prior British patent specification No. 155,052 which comprises an envelope holding receptacle or magazine and a plate slidable beneath the envelope receptacle adapted to engage behind the flap of the lowermost envelope, remove the latter from the receptacle, and simultaneously moisten the gummed surface by means of a damped pad carried adjacent the under-surface of the plate and finally to deliver the envelope to roller closing means. The means for feeding the strip of stamps are of the type involving a reciprocating feeding member carrying a plurality of independent movable pins or fingers which are freely pivoted upon a common shaft and are adapted to engage with the perforations in the strip.

The stamp thus fed forward is moistened and affixed to the envelope previous to the sealing of such envelope which sealing process has hitherto been effected by means of a pair of opposed rollers or continuous bands.

According to this prior Patent No. 155,052 the moistened envelope is delivered upon the forward movement of the carrier to beneath a stationary platen in which position it is held during the return movement of the carrier and subsequently sealed by means of a roller, which roller is disposed in advance of the carrier to which it is connected through the medium of a lost motion connection with the result that this roller is drawn across the under surface of the envelope consequent upon, and at a predetermined point in the return movement of the carrier.

The envelopes are placed in the hopper in such a position that the open side of the flap opposes the direction of movement forward of the reciprocating carrier. This carrier is slidably mounted near the top side of the casing, reciprocation being effected through the medium of the handle in any convenient manner.

At or about the commencement of its forward movement the carriage engages the envelope by inserting itself between the flap and the envelope proper so that the flap projects beneath the carriage. Upon continuing the movement the flap is pressed into contact with the moistened pad which is secured to the underside of the carriage, by means of a roller which is previously displaced against spring pressure consequent upon the forward movement of the carriage.

The continued movement of the carriage forces the envelope to a position beneath a platen in which position it is held during the returned movement of the carriage by means of a spring controlled transverse member provided with a gripping surface.

During the forward movement of the carriage as just described the same operates to carry forward a roller. Upon the return stroke this roller is pulled across the undersurface of the envelope with the result that the previously moistened flap is pressed against the corresponding surface of the envelope thus sealing the same. The requisite pressure on the roller may be obtained by spring means.

According to the present invention several improvements are embodied in this machine which I have found desirable for the working of the machine at the maximum of efficiency, such improvements relate to the means for stacking the envelopes at the initial stage of the operations, substituting a non-rotatable member for the roller which in my earlier specification operates to press the flap of the envelope into contact with the moistened pad, the manner of carrying such non-rotatable member, the means for effecting the moistening of the pad, means for effecting a compact and tidy packing of the envelopes at the final stage of operations in the receiving drawer, means for enabling the moistening means to be rendered inoperative when it is not required to moisten the envelope flaps, and means for automatically registering the number of stamps employed.

Dealing with the improvements in the sequence specified the stacking of the envelopes in the initial stage is effected by substituting for the hopper which hitherto has been employed, a plurality of rods or bars adapted to be inserted so as to stand upright in holes formed in a bar extending across the machine at a point substantially corresponding to the position which was taken up by the lower forward edge of the hopper. This provision allows for a much more even stacking of the envelopes and further provides convenient access to any part of the stacked envelopes on the part of the operator should any adjustment be required. The bar referred to as extending across the machine is stationary and carries a downward depending strip of rubber or other suitable material which is engaged by the envelopes as they pass thereunder; the provision of this strip enabling any thickness of envelope to be passed thereunder and also serving to prevent more than one envelope at a time passing thereunder.

The non-rotatable member which is provided instead of the roller referred to comprises a bar bridging a pair of swinging arms in a disposition similar to that of the roller it substitutes. This bar is preferably serrated at its rearward upper face which engages the flap of the envelope as I find in practice that this serrating effects a more even distribution of the moisture from the pad on to the gummed surface of the flap of the envelope and also tends to keep the outer surface of the envelope dry and clean.

The means in effecting the moistening of the pad according to the present invention comprises a well of cylindrical or other convenient shape having a slot in its upper surface through which is inserted a piece of wick or other suitable material of a capillary nature which is led from the moistening pad. The moistening pad and well are carried by a frame connected across the ends of a pair of bell crank levers, the other ends of which levers are connected by coiled springs to the swinging arms carrying the serrated member referred to in the previous paragraph. This construction enables the pad to be swung downwards clear of the carriage subsequent to the moistening of the envelope flap and the coiled springs serve to maintain the flap of the envelope pressed between the serrated member and the pad during the moistening operation. The frame carrying the pad is engaged by a swinging arm which carries the carriage forward, such engagement being effected subsequent to the moistening of the flap, whereby the pad is swung downwards against the action of the coiled springs. Upon the return of the carriage to its initial position the coiled springs serve to return the pad to its uppermost position and the pad is subsequently pulled to its initial inoperative position by the engagement thereof by the frame carrying same by one or a pair of lugs carried on the underface of the sliding carriage, such lug or lugs being carried on the forward face to enable it to slide freely over the frame of the pad during the forward movement of the carriage.

To ensure an even and compact packing of the envelope in the receiving drawer in such manner that the envelopes are not loose within the drawer thereby impeding the delivery of further envelopes means is provided for pressing the envelopes in a compact bundle against the front face of the drawer, each envelope as it arrives in the drawer being neatly and firmly added to the pile already packed. This I effect by providing a plurality of upstanding fingers projecting through the base of the drawer which are carried by a transverse horizontal rod cranked at one or both ends where it is connected to one or a pair of coiled springs which normally holds the fingers upright. These fingers serve as stops for the envelopes as they fall into the drawers so as to hold each envelope substantially upright when delivered into the drawer and these fingers are forced down out of the way by a reciprocating wall or buffer which comes forward to press the envelope towards the front of the drawer. For retaining the envelopes in their stacked position a further plurality of fingers are provided projecting through the base of the drawer in advance of the aforementioned fingers. These retaining fingers are carried by a substantially horizontal frame disposed beneath the drawer and pivotally supported at its rearmost end to a convenient part of the frame of the machine whereby it may have a limited upward and downward movement sufficient to move the fingers carried by the frame clear of the base of the drawer when the envelope is being moved forward. Downward movement of the fingers is effected by means of an upstanding spring actuated pawl connected to the pivoted frame and having a cam face towards the rear of the drawer whereby when the reciprocating wall or buffer moves forward it passes over said pawl forcing it with the frame and fingers downward against the action of spring means, such spring means operating to return the frame and fingers immediately the buffer has passed over same, the spring pawl being swung down against the action of its spring independently by the return of the drawer. To provide an additional abutment to these fingers a swinging frame is provided above the base of the drawers comprising a transverse bar extending across the opening through which the drawer moves, said bar being carried by a pair of longitudinally and horizontally disposed arms pivoted to a convenient part of the machine downwards. Upon the spindle carrying these arms is provided a downwardly depending loose finger provided with an abutment adapted to engage one of such arms, whereby upon the swinging forward of this finger the arms with their transverse bar are swung upwards, so that the transverse bar clears the envelopes as they are moved forward but drops down to provide an abutment when the reciprocating wall or buffer is moved rearwardly. The movement of the loose finger is effected by being engaged by an extension carried by the frame of the reciprocating wall or buffer.

The base of the drawer is preferably constituted by a plurality of parallel longitudinally disposed rods, whereby the fingers referred to may conveniently project through the base of the drawer.

In order that my invention may be clearly understood and readily carried into effect I have appended hereto a sheet of drawings illustrating same wherein:—

The machine illustrated in the drawings is somewhat similar to that shown in my said earlier British Patent No. 155,052, and comprises a box like casing 1 having a detachable top cover 2 which carries a rectangular bar like structure 3 constituted by three horizontal members, one of which $3^a$ is adjustable longitudinally by means of a feed screw 4 rotatably secured thereto and threaded through a fixed lug 5, a milled head $4^a$ being provided for operation. Each of the three horizontal bar members 3 is provided with a plurality of shallow vertical holes $3^b$ for the reception of a number of detachable vertical rods 6. Transverse adjustment or alignment of the stacked envelopes is effected by means of an inverted U shaped block 7 slidable upon the adjustable bar $3^a$ and secured by a set screw $7^a$. A projecting finger 8 is carried by the block 7 having one or more holes for the reception of a corresponding number of vertical rods 6, adapted to engage one edge of the envelope. By this arrangement an adjustable cage like structure is provided for stacking the envelopes at the initial stage of operations, such a structure providing convenient access of the envelopes by one operator.

The top cover is cut away as at $8^a$ directly beneath the cage like structure to constitute a means for exposing the envelopes singly to the carrying mechanism. This mechanism consists of a slidably mounted carrier plate 9 which is reciprocated longitudinally of the casing by means of an operating handle 10 through the medium of a crank 11 and link 12 which former is carried by a transverse shaft 13, the outer end of which carries the operating handle 10.

Figure 5:
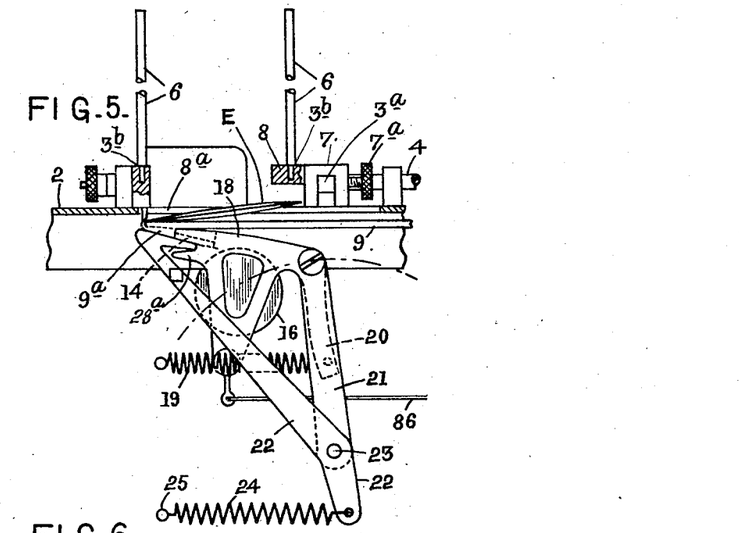
Figs. 5 and 6 are side elevational views in full and section respectively of the flap moistening means.
Figure 6:
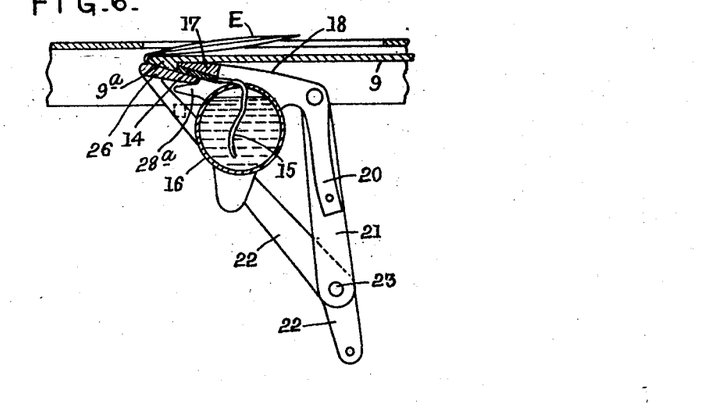

Disposed transversely underneath the carrier plate 9 is a strip of absorbent material 14 (see more particularly Figs. 5 and 6) to which moisture is conveyed by a wick 15 which depends within a drum shaped water receptacle 16. This strip of absorbent material is carried underneath and by a bar 17 secured at its extremities to the upper forward end of a pair of quadrant shaped arms 18 adapted to move forward for a limited distance with the carrier plate 9 under the influence of a strong coiled spring or a pair of springs 19 connected each to a depending arm 20 constituting an integral continuation of the arcuate portion of the quadrant shaped arm 18. The forward and upper edge of the bar 17 abuts against the rear of the pointed forward end of a carrier plate 9 which is thickened as at $9^a$ for this purpose.

The quadrant shaped arms 18 are pivotally supported at the upper extremities of a pair of links 21 the lower extremities of which are pivotally connected to a pair of transversely aligned levers 22 fulcrumed on a fixed common axis 23 and having their lower extremities connected to a strong coiled spring 24 anchored at 25. The effect of this spring 24 is to press the upper end of these levers which are connected by a transverse bar 26, upwards whereby this bar 26 during the inoperative period of the machine is disposed beneath the stack of envelopes so that the flap of the lowermost envelope rests thereon as shown at 27 in Fig. 1.

As the carrier 9 moves forward the bar 17 carrying the strip of absorbent material moves forward with it as hereinbefore described, and the pointed end of the carrier engages between the flap and the body of the envelope consequently the gummed portion of the flap resides against the strip of absorbent material and is held pressed against same by the transverse bar 26 pressing upwards under the influence of its spring 24. The forward upper ends of the quadrant arms 18 are bifurcated as at 28 to engage over the transverse bar 26 to ensure correct co-operation of the bar 26 and the moistened strip 14.

Figure 1:
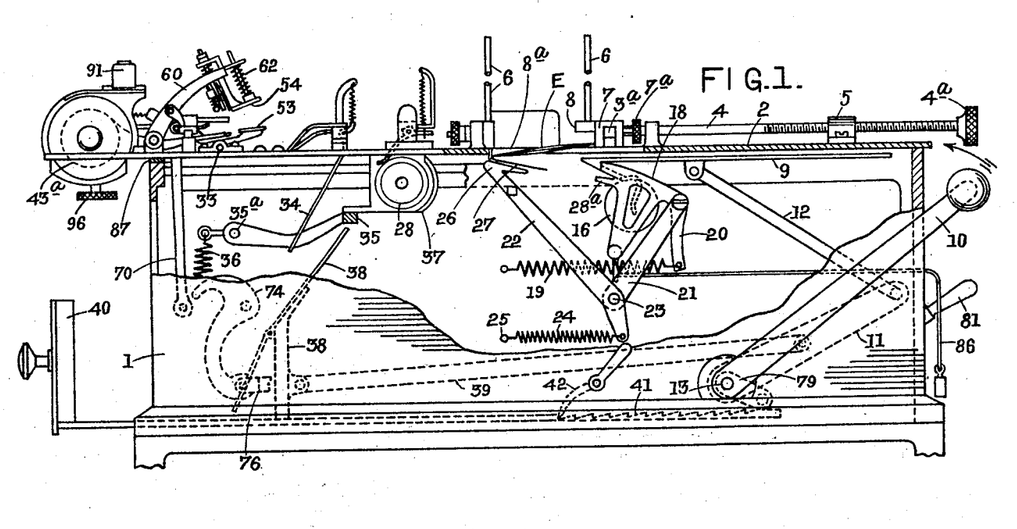
Fig. 1 is a part sectional side elevation of the machine at start of movement.
Figure 2:
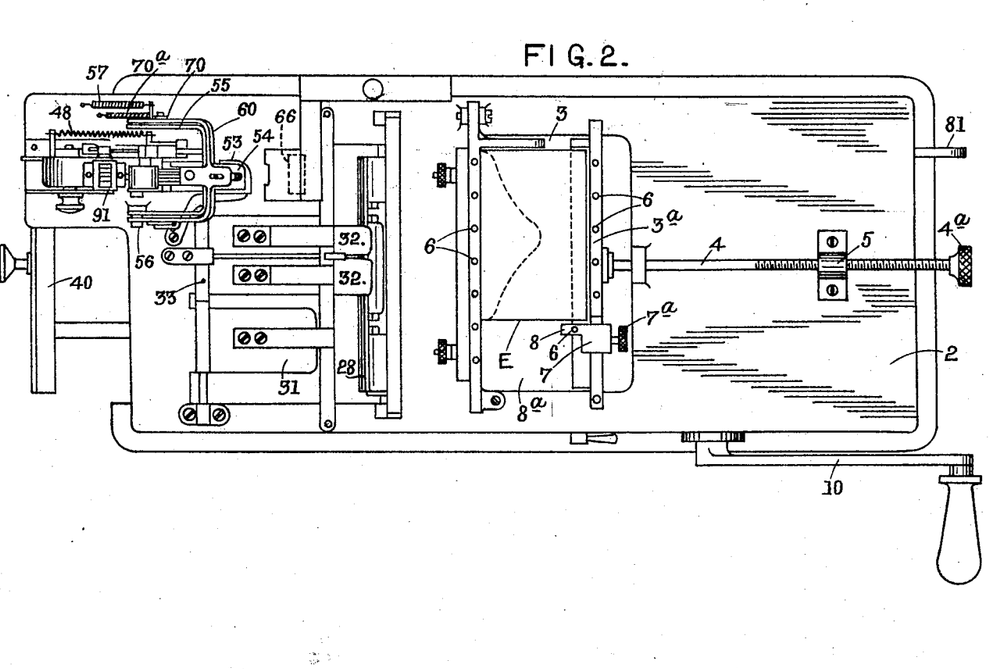
Fig. 2 is a plan of the same.

The envelopes are positioned within the hopper so as to lie horizontally with the flaps on the underside and remote from the carrier when in its full retracted position as shown in Figs. 1 and 2. This enables the forward transverse edge of the carrier, when sufficiently advanced, to interpose itself between the flap and the envelope proper, and to finally engage the envelope at the folded over edge of the same. The continued movement of the carrier thus takes with it the bottom envelope so engaged and forces it forward beneath the fixed part 3 of the envelope opening in the top cover 2. During this movement the flap of the envelope is beneath the carrier with the gummed surface presented thereto. Contact between this gummed surface and the moistened absortent pad 14 is made during this forward movement by means of the bar 26 which is movable about the axis 23.

It will thus be seen that the forward movement of the carrier operates to press this bar 26 against the envelope flap and as a consequence, the gummed surface of the same is pressed against the moistened absorbent pad 14.

The final sealing or closure of the envelope is effected in a manner hereafter to be described through the medium of the roller 28. This roller is positioned in advance of the forward edge of the carrier 9 and is carried by a pair of arms 29 disposed one at each side of the roller. The outer or free ends of these arms are each connected to an adjacent side of the carrier through the medium of longitudinal slots 30. For this purpose the extremities of these arms are bent over so as to be capable of engaging the ends of the slots.

By these means a predetermined degree of lost motion is provided whereby at certain periods in the working stroke of the carrier such carrier moves relatively to the roller as will hereafter appear.

The continued forward movement of the carrier carries the envelope to a position directly beneath a platen 31 consisting of a plurality of spring controlled plates 32 hingedly connected to the top cover at 33 the purpose of said plates being to provide yieldable abutments for the upper face of the envelop so that roller 28 passing beneath same will effect sealing of its flap in a manner which will presently appear. In this position the envelope is retained after the carrier has passed on its return stroke by means of spring controlled fingers 34 and a gripper 35. The fingers 34 are automatically raised to engage the upper surface of the envelope by the contact therewith of the forwardly moving roller 28 the normal tendency of such fingers being to remain lowered in the position shown in Fig 1. These fingers 34 operate to remove the sealed envelope from beneath the platen in a manner as will hereafter appear.

The gripper 35 which is pivoted at 35$^a$ is maintained normally depressed by engagement with a specially shaped housing 37 see more particularly Fig. 1 a spring 36 tending to raise the same as soon as the housing has been moved sufficiently consequent upon the forward movement of the carrier plate 9.

The rear side of this housing is curved as shown whilst the forward end projects in advance of the roller sufficient to maintain contact with the gripper when the carrier is in the full retracted position and so maintain the gripper depressed as above mentioned. When the carrier is moved into the full forward position this housing is moved clear of the gripper with the result that when the carrier reaches a certain part of its return journey the gripper is moved into engagement with the undersurface of the positioned envelope by means of the spring 36 and there operates to prevent backward movement of the envelope whilst the carrier is being returned to its normal or retracted position. This is effected by forming the gripper with a roughened engaging face, which extends laterally of the machine, the full width of the envelope.

Upon the return movement of the carrier the curved face of the housing contacts with the gripper and so operates to depress the same against its controlling spring. The depressing movement of the gripper commences just before the fingers 34 have been fully released by the roller 28 with the result that the envelope is free to fall on to the inclined transverse wall 38 which causes it to finally enter the receiving trough in a vertical position. When the gripper is removed from the engagement with the envelope the fingers 34 operate to assist its removal from beneath the platen.

This wall 38 is slidably mounted upon the base of the casing and is movable consequent upon the operation of the operating handle 10 inasmuch as the same is connected to a point on the crank 11 by means of a link 39. This construction enables the envelopes to be pushed forward at each operation against the vertical pad 40. To accommodate an increasing number of envelopes the pad 40 is slidable and carries a rack 41 the teeth of which are engaged by a pawl 42 pivotally mounted in the side of the casing 10. The inner end of this rack is engaged by a suitable spring not shown which operates to maintain the pad in its closed position.

This spring influence is however, overcome when sufficient envelopes have collected to provide the necessary buffer between the reciprocating wall 38 and the pad 40 with the result that at each forward motion of the wall the pad is pushed back.

The return of the pad is prevented by the engagement between the pawl and the rack so that the wall is free to recede previous to the admission of each envelope.

It will thus be seen that the roller 28 is caused to pass across the undersurface of the envelope upon the return movement of the carrier after the depression of the finger 34 and the gripper 35. This operates to press the envelope firmly against the undersurface of the platen 31 and so effects the sealing of the gummed flap. The actual release of the envelope is effected by means of the finger 34 and occurs after the passage thereacross of this roller.

Figure 7:
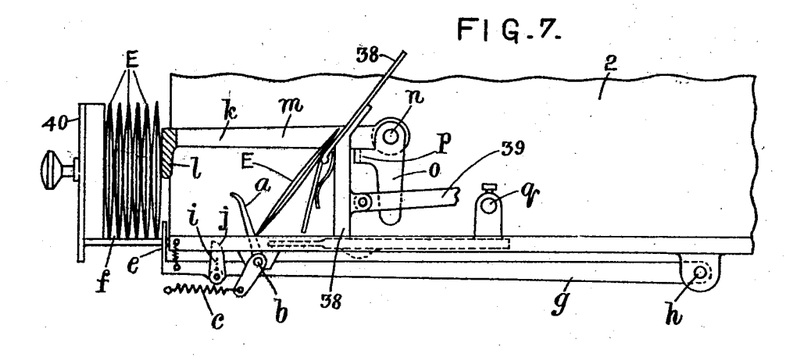
Figs. 7 and 8 are detail side and plan views respectively illustrating the envelope stacking mechanism.
Figure 8:
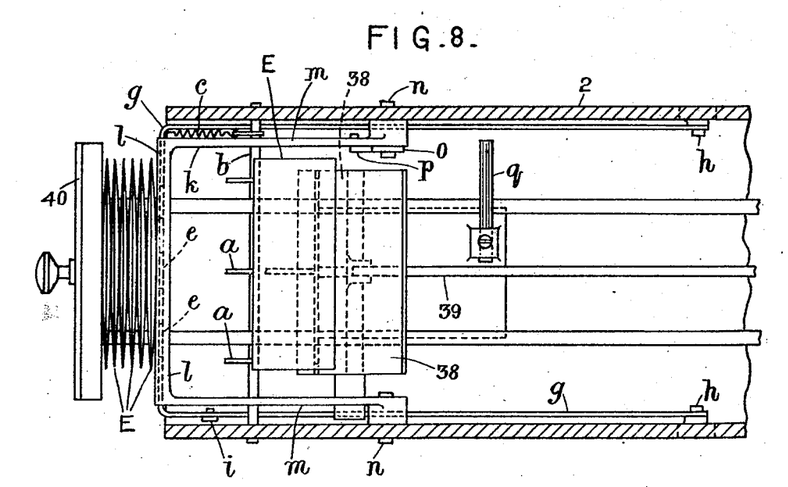

To ensure an even and compact packing of the envelopes in the receiving drawer in such manner that the envelopes are not loose within the drawer thereby impeding the delivery of further envelopes means is provided for pressing the envelopes in a compact bundle against the front face of the drawer, each envelope as it arrives in the drawer being neatly and firmly added to the pile already packed. This I effect by providing a plurality of upstanding fingers $a$ (see more particularly Figs. 7 and 8) projecting through the base of the receiving trough $f$ which fingers are carried by a transverse horizontal rod $b$ cranked at one or both ends where it is connected to one or a pair of coiled springs $c$ which normally holds the fingers upright. These fingers $a$ serve as stops for the envelopes as they fall into the drawers so as to hold each envelope substantially upright when delivered into the receiving trough $f$ and these fingers are forced down out of the way by the reciprocating wall or buffer 38 which comes forward to press the envelope towards the front of the drawer. For retaining the envelopes in their stacked position a further plurality of fingers $e$ are provided projecting through the base of the trough $f$ in advance of the aforementioned fingers. These retaining fingers $e$ are carried by a substantially horizontal frame $g$ disposed beneath the receiving trough and pivotally supported at its rearmost end as at $h$ to a convenient part of the frame of the machine whereby it may have a limited upward and downward movement sufficient to move the fingers carried by the frame clear of the base of the receiving trough when the envelope is being moved forward. Downward movement of the fingers is effected by means of an upstanding spring actuated pawl $i$ connected to the pivoted frame and having a cam face $j$ towards the rear of the receiving trough whereby when the reciprocating wall or buffer moves forward it passes over said pawl forcing it with the frame and fingers downwards against the action of spring means, such spring means operating to return the frame and fingers immediately the buffer has passed over same, the spring pawl $i$ being swung down against the action of its spring independently by the return of the receiving trough. To provide an additional abutment to these fingers a swinging frame $k$ is provided above the base of the drawers comprising a transverse bar $l$ extending across the opening through which the trough moves, said bar being carried by a pair of longitudinally and horizontally disposed arms $m$ pivoted as at $n$ to a convenient part of the machine. Upon one of the spindles carrying these arms is provided a downwardly depending loose finger $o$ provided with an abutment $p$ adapted to engage one of such arms, whereby upon swinging forward of this finger $o$ the arms with their transverse bar are swung upwards, so that the transverse bar clears the envelopes as they are moved forward but drops down to provide an abutment just before the reciprocating wall or buffer is moved rearwardly. The movement of the loose finger is effected by being engaged by an extension $q$ carried by the frame of the reciprocating wall or buffer 38.

The stamping mechanism, (see especially Figs. 9 to 14) comprises a detachable drum 43 mounted upon a central detachable pivot pin 44 which carries one flange of the drum and upon which is mounted a roll of stamps 43ª of the desired value.

These stamps are fed forward a distance equal to the length of a single stamp by means of a plurality of hinged fingers 45 which normally rest upon the upper surface of the stamps, which fingers are so shaped at their forward extremities and positioned laterally relative to each other that upon being moved forward they engage the perforations constituting the line of division between adjacent stamps.

These fingers are carried by a saddle piece 46 which is mounted upon a longitudinal slide bar 47.

Figure 11:
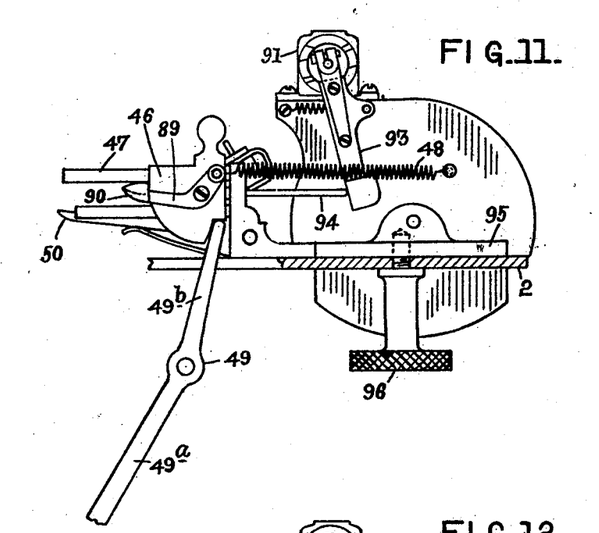
Figure 12:
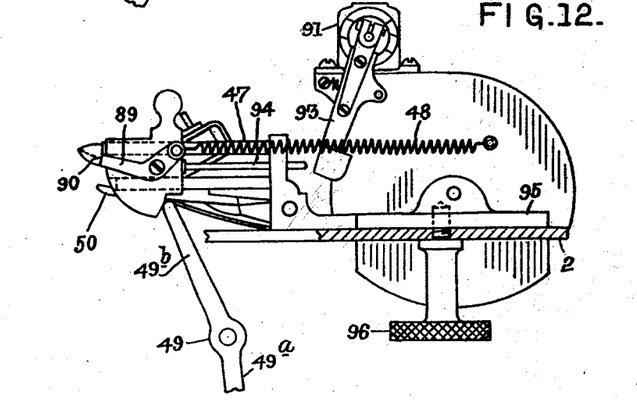

The movement of the saddle piece is effected consequent upon the forward movement of the reciprocating wall 38 through the medium of a pivoted lever 49, (see Figs. 11 and 12). This lever 49 is so pivoted that its long side 49ª depends downward within the casing 1 so as to reside in the path of a projection carried by the reciprocating wall 38. The upper or short side 49$^b$ of the lever projects through a slot in the top plate 2 and engages underneath the saddle piece (see Figs. 11) which is consequently moved rearwardly, as the carrier advances, against a spring 48.

Figure 9:
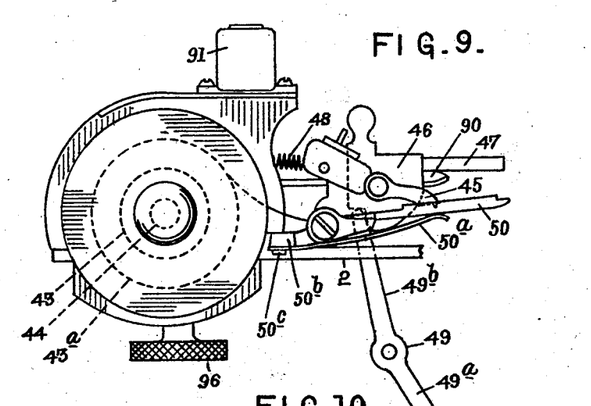
Figs. 9, 10, 11, 12, 13 and 14 are views of the stamp feeding and affixing mechanism.
Figure 10:
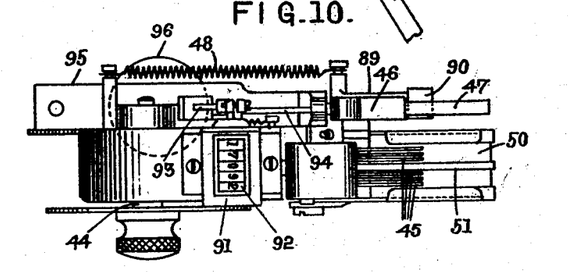

The projecting strip of stamps is guided by a channel plate 50 which is hingedly connected at its inner end and is normally retained in the raised position shown in Fig. 9 by a spring 50$^a$ which is anchored to a lug 50$^b$ by a pin or screw 50$^c$.

A leaf spring 51 is maintained pressed against the top surface of the stamps and such spring operates to prevent the stamps from creasing or bending when being fed forward.

When in the fullest forward position the stamp to be affixed is supported by a plate 53 (Figs. 13 and 14) which is automatically removed previous to the affixing operation in a manner hereafter to be described.

The means for affixing the stamp to the surface of the envelope comprises a presser 54 which is carried upon the forward extremity of a yoke 55.

This yoke is pivotally mounted by its extremities as at 56 so as to be capable of moving about such pivots in a substantially vertical plane.

Figure 13:
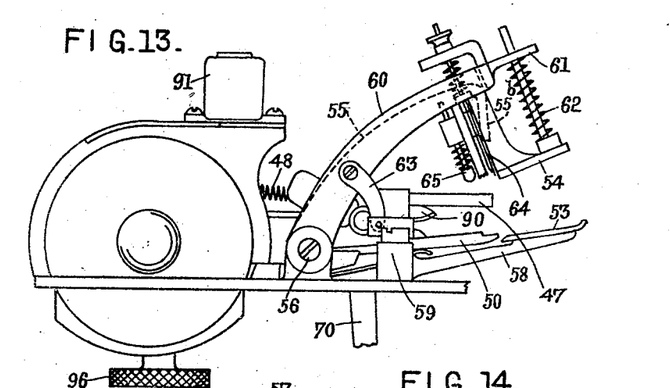
Figure 14:
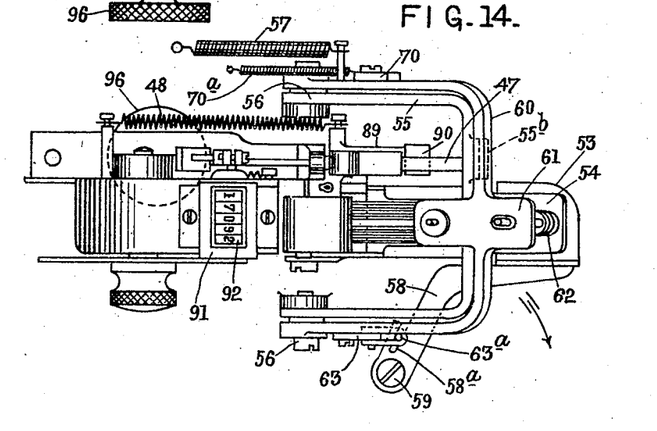

The downward movement of the yoke 55 is controlled by a coiled spring 57 which spring operates to return the yoke and presser to their normal position shown in Fig. 13 when released.

The downward movement of the presser occurs simultaneously with the outward movement of the plate 53. This is effected by disposing the plate 53 upon the free extremity of an arm 58 which arm in turn is mounted upon a vertical pivot 59. This enables the arm and plate to be moved inwardly across the top of the machine in a horizontal plane from beneath the presser 54, as shown by the arrow in Fig. 14. The synchronous movement of the presser and this plate 53 is obtained through the medium of a yoke 60 the ends of which are mounted upon extensions of the pivots 56 whilst its central portion or free extermity carries a lug 61 which is supported by the upper surface of the presser 54 through the medium of a spring 62. The arm 58 is provided near its pivot 59 with a slotted portion 58$^a$ which is engaged by a pin 63$^a$ carried by a pawl shaped link 63 pivotally supported by the yoke 60, whereby vertical swinging movement of the yoke 60 transmits horizontal movement to the arm 58, and the movement of the yoke 60 is also in turn transmitted to the presser 54 and yoke 55 through the medium of the spring 62. After being affixed to the envelope the stamp is severed from the strip by means of a vertically and laterally disposed knife 64. This knife is carried by the member 61 so as to be slidable vertically between the opposing faces of the presser 54 and a spring pressed member 65 which operates to hold the strip of stamps against movement during the operation of severing the affixed stamp.

Figure 15:
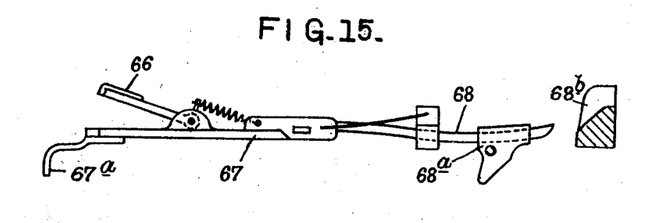
Figs. 15 and 16 are side elevation and plan views respectively of the device for moistening the stamps.
Figures 16, 17:
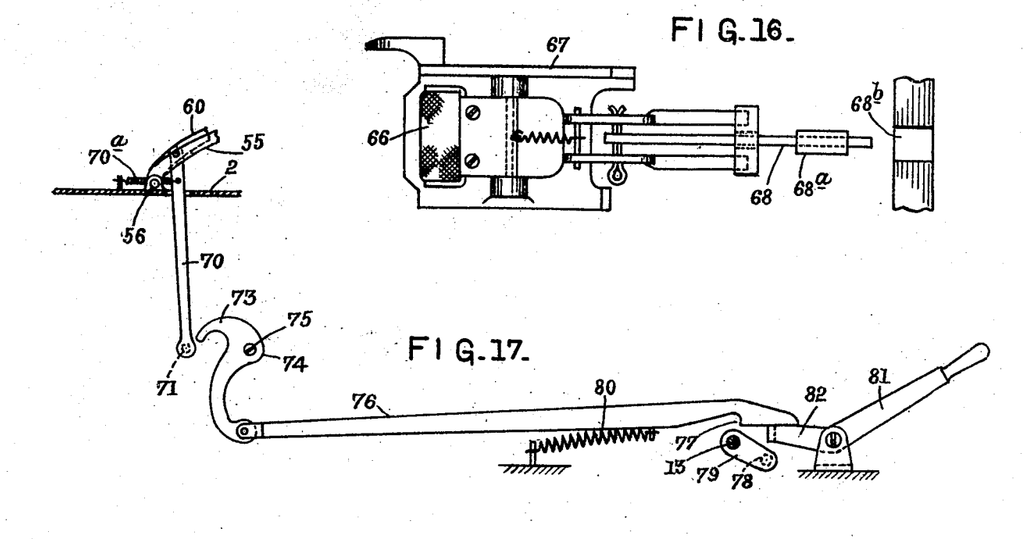
Fig. 17 is a detail side elevation view of the mechanism for throwing the stamp affixing mechanism in or out of action.
Figure 18:
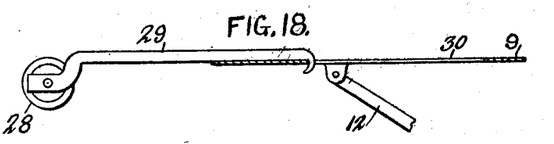
Fig. 18 is a detail sectional view showing the engagement of the roller carrying arms with the carrier.
Figure 19:
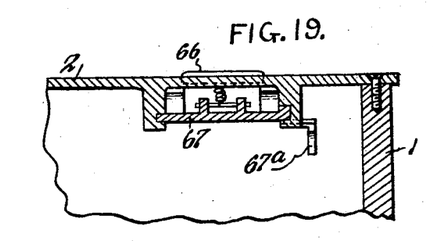
Fig. 19 is a detail sectional view showing the manner of mounting the moistening carriage.

Previous to being affixed the adhesive surface of the stamp is moistened by means of a resiliently and pivotally supported pad 66 (Figs. 15 and 16) which is carried by a sliding carriage 67. Upon the forward movement of the carrier this carriage 67 and pad 66 are moved forward to a position which is in advance of the stamp to be affixed.

Figure 3:
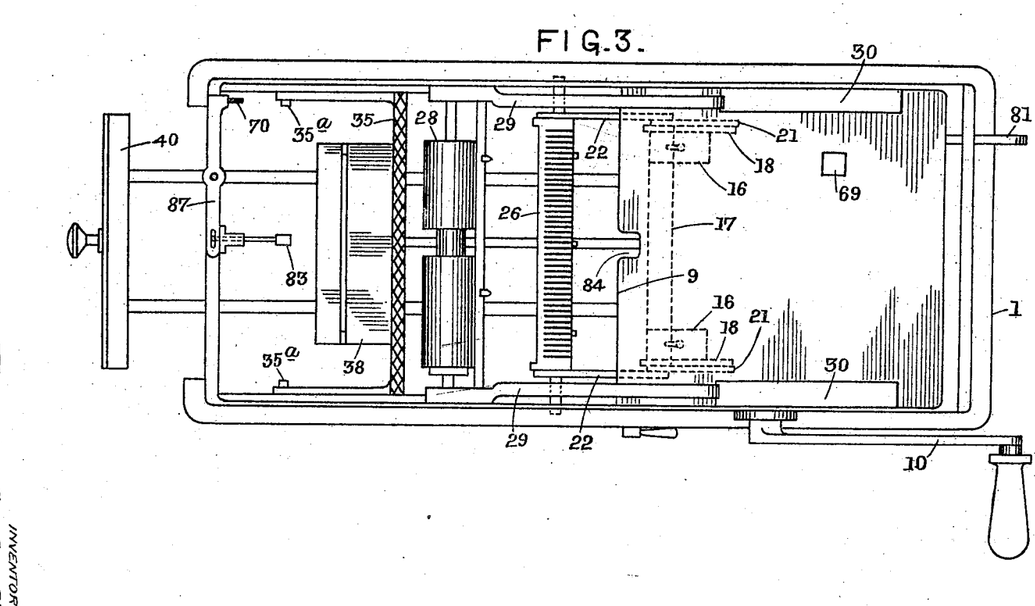
Fig. 3 is a plan of the same with the top cover removed.
Figure 4:
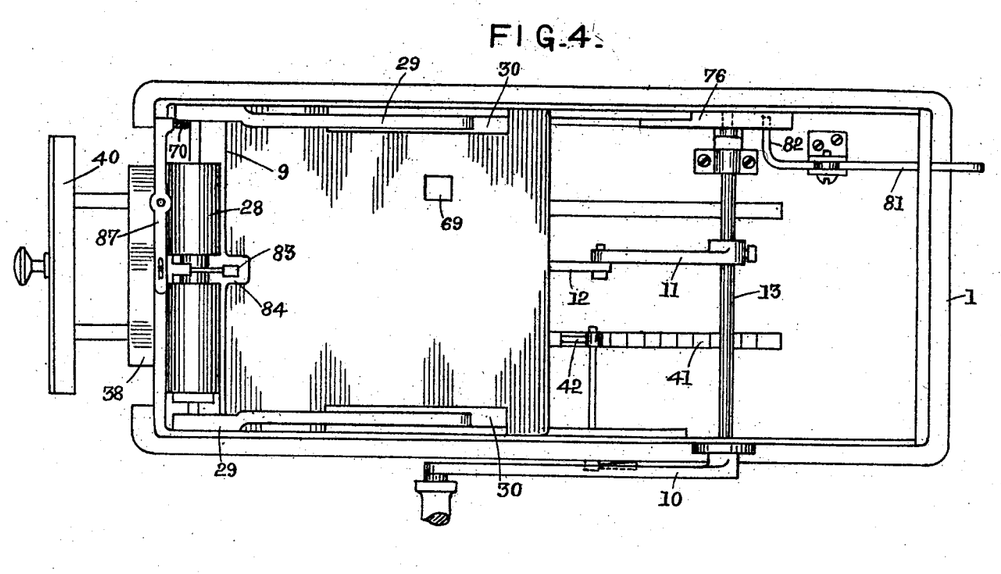
Fig. 4 is a similar view but showing the carriage at the end of its full forward travel.

During this movement the cam shaped extremity 68$^a$ of a resilient supported arm 68 rides on top of the carrier and drops into a slot 69 (Fig. 3) formed therein. This arm 68 is pivotally connected to the sliding carriage 67, and always tends to move downwards with the result that upon the return movement of the carrier 9 the cam shaped extremity of such arm engages in the slot 69 and thus effects retraction of the carriage 67. This operates to draw the pad 66 across the undersurface of the stamp which is pressed thereupon by the presser with the result that the adhesive surface of the stamp is moistened. After the passage of the pad 66 the presser continues its downward movement until it forces the stamp into contact with the surface of the envelope. At this time the roller 28 has commenced its return journey the centre of the same being now in a position just ahead of the presser. This checks the further downward movement of the presser but a continued independent movement of the yoke 60 occurs against the action of the spring 62. This continued movement is transmitted to the knife 64 which consequently moves downwards during which movement it effects severance of the stamp.

Before the carriage 9 is completely retracted the cam 68$^a$ is engaged with a fixed bar 68$^b$ whereby the cam is raised out of engagement with the carriage. Upon the next forward movement of the carriage 9 the carriage 67 is returned by the forward edge of the carriage 9 engaging a depending finger 67$^a$ carried by the carriage 67.

During these movements the roller 28 continues to move along the position of the presser on the under side of the envelope thus causing the stamp to be firmly held and affixed prior to severance.

The saddle piece 46 is locked in the forward position against the action of a coiled spring 48, by means of a pivoted cranked catch 89 carried thereby, the spring 48 being anchored thereto so as to always maintain the forward end of the catch 89 with a tendency to move upwards. This catch 89 has at its forward end a short laterally extended nose 90 which is adapted to engage over the extremity of the guide rod 47 (see Fig. 12) thereby holding the saddle stationary until the yoke 55 descends and a lug 55ᵇ carried thereby strikes the top of the nose 90 and disengages it from the end of the guide rod 47 with consequent returning of the saddle, under the influence of the spring 48, to normal position.

All of the above mechanisms with the exception of the saddle piece 46, are operated consequent upon the movement of the operating handle 10 through the medium of a depending swinging link 70 (Figs. 1 and 17) which is connected at its upper end to the yoke 60. The lower extremity of this link is formed with a lateral projection 71 engaging the bent extremity 73 of a hook shaped bell crank lever 74. This bell crank is pivoted to the casing or other convenient part of the machine as at 75 whilst the lower extremity is engaged by the forward extremity of a link 76.

Near the rear extremity of this link 76 and upon the undersurface thereof is formed an abutment 77 which is normally adapted to be engaged by a crank pin 78 carried by the crank 79 which latter is mounted upon the transverse shaft 13.

In operation the oscillation of the crank 79 consequent upon the operation of the operating lever 10 brings the pin 78 into successive engagement with the abutment 77 upon each return stroke of the handle 10 with the result that the link 76 is thereby retracted against the action of a spring 80. The bell crank is thereby turned about its pivot thus pulling the swinging link 70 down with the bent arm 60 with the result aforementioned.

To render the stamp mechanism inoperative the rear extremity of the link 76 is raised out of the path of the oscillating crank pin 78 through the medium of a lever 81, the forward extremity 82 of which engages the undersurface of the extremity of the link 76. The handle portion of this lever 81 projects through the side of the casing 10 so as to be operable by hand from the exterior thereof. Suitable means not shown are provided for retaining this lever in the depressed position.

The sequence of operations of the machine are as follows:—

Upon the forward movement of the carrier 9 the envelope is delivered to a position beneath the platen 31. During this movement a stamp is fed forward into the affixing position as also is the pad 66. This completes the forward motion of the carrier.

Upon the return movement of the carrier the plate 53 is swung out of position and the presser lowered into contact with the stamp. The pad 66 now commences its return movement during which movement it is wiped across the adhesive surface of the stamp which is held firmly against the pad by the presser.

When the pad has returned to its normal position the presser operates to affix the stamp to the envelope. The stamp is then severed as before mentioned.

During these operations the roller 28 is moved across the undersurface of the envelope the operations being so timed that approximately simultaneous with the severance of the stamp occurs the release of the envelope.

Means are preferably provided whereby the stamping mechanism is rendered automatically inoperative when the machine is being operated without an envelope being in position on the carrier. One suitable means for effecting this comprises a plunger 83, see Fig. 3, which is disposed horizontally and in a plane level with the forward edge of the longitudinal centre of the carrier. At the central point on the edge of the carrier coincident with the position of the plunger 83 is formed a gap 84 which is so dimensioned as to just clear the plunger on all sides when the carrier is in its fullest forward position. It will thus be seen that when an envelope is not in position on the carrier this gap renders the plunger inoperative but when an envelope is in position this gap is bridged with the result that the plunger is pressed back by the coacting edge of the envelope. The swinging link 70 is disposed behind the plunger 83 and a fulcrumed lever 87 is interposed between the plunger 83 and the swinging lever so that the backward movement operates to similarly move the swinging link about its pivot with the result that the lateral projection 71 of the link is moved into engagement with the bell crank lever 74. The swinging link when released is returned to its disengaged or normal position by means of a compression spring 70ᵃ conveniently connected thereto.

The moistened pad 14 may be moved to an inoperative position by swinging the bar 17 downwards so as to engage underneath the bar 26, this being effected by a pull on a cable or cord 86 connected to the bar 17 thereby making the machine applicable for stamping only should it be desirous to leave the envelope open.

To ensure a correct register of the number of stamps employed, an indication 91 is provided above the stamp drum 43. This indicator may be of any known type, and I find a very suitable type is the well known "Veeder" cyclometer having a small transparent roof 92 through which the numbers are visible. These numbers are altered increasingly in units, by the reciprocation of a depending arm 93 the lower end of which is maintained pressed against the free end of a small rod 94 which slides through the lug 50ᵇ and is carried by the saddle 46, consequently this arm 93 will follow the movement of the saddle 46, whereby each movement of the saddle will increase the number registered by the meter by one.

To enable the stamping mechanism to be removed should it not be required to stamp the envelopes it is carried by a base plate 95, which is detachably clamped to the top plate of the machine by a clamping screw 96 passed through a web like lateral extension on the edge of the top plate.

Having now particularly described and ascertained the nature of my said invention and in what manner the same is to be performed, I declare that what I claim is:—

1. An envelope sealing machine comprising, in combination, an envelope holding structure adjustable to accommodate envelopes of different sizes, a slidable carriage and a bar movable therewith between which the envelopes are adapted to be engaged and moved to a point in the machine for sealing, a gum moistening pad movable with said carriage and bar and adapted to be engaged by the flap of an envelope engaged between the latter, roller means for sealing the envelope flaps, and means for effecting compact packing of the envelopes after they are sealed.

2. An envelope sealing machine comprising, in combination, an envelope holding structure adjustable to accommodate envelopes of different sizes, a slidable carriage and a bar movable therewith between which the envelopes are adapted to be engaged and moved to a point in the machine for sealing, a gum moistening pad movable with said carriage and bar and adapted to be engaged by the flap of an envelope engaged between the latter, roller means for sealing the envelope flaps, means for effecting compact packing of the envelopes after they are sealed, and means for stamping the envelopes attachable and detachable as a unit to and from the machine.

3. An envelope sealing machine comprising, in combination, an envelope holding structure adjustable to accommodate envelopes of different sizes, a slidable carriage and a bar movable therewith between which the envelopes are adapted to be engaged and moved to a point in the machine for sealing, a gum moistening pad movable with said carriage and bar and adapted to be engaged by the flap of an envelope engaged between the latter, roller means for sealing the envelope flaps, means for effecting compact packing of the envelopes after they are sealed, and means to move and hold said gum moistening pad out of envelope flat engaging position whereby the machine may be used to stamp envelopes without sealing the same.

4. An envelope sealing machine comprising, in combination, a slidable carriage and a bar between which envelopes are adapted to be engaged and moved to a point in the machine for sealing, a pivoted arm carrying said bar, a link pivotally connected to said arm, a quadrant-shaped member pivotally connected to said link, resilient means acting to move said arm and link normally together into envelope engaging relation, and a gum moistening pad carried by said quadrant-shaped member in position to be engaged by the flap of an envelope engaged between the bar and carriage.

In witness whereof I have signed this specification in the presence of two witnesses.

THOMAS CARDWELL.

Witnesses:
O. S. MICKLIN,
P. TRAVERS.